US012194646B2

(12) United States Patent
Werner

(10) Patent No.: US 12,194,646 B2
(45) Date of Patent: Jan. 14, 2025

(54) BLADE ASSEMBLY HAVING ENTRAPPED SPRING

(71) Applicant: Andis Company, Sturtevant, WI (US)

(72) Inventor: Edwin A. Werner, Union Grove, WI (US)

(73) Assignee: Andis Company, Sturtevant, WI (US)

( * ) Notice: Subject to any disclaimer, the term of this patent is extended or adjusted under 35 U.S.C. 154(b) by 0 days.

(21) Appl. No.: 18/363,183

(22) Filed: Aug. 1, 2023

(65) Prior Publication Data

US 2023/0373113 A1 Nov. 23, 2023

Related U.S. Application Data

(63) Continuation of application No. 17/235,398, filed on Apr. 20, 2021, now Pat. No. 11,752,648, which is a (Continued)

(51) Int. Cl.

*B26B 19/06* (2006.01)
*B26B 19/20* (2006.01)
*B26B 19/38* (2006.01)

(52) U.S. Cl.

CPC ............ *B26B 19/06* (2013.01); *B26B 19/063* (2013.01); *B26B 19/205* (2013.01); *B26B 19/3846* (2013.01)

(58) Field of Classification Search

CPC ....... B26B 19/02; B26B 19/04; B26B 19/046; B26B 19/048; B26B 19/06; B26B 19/063;
(Continued)

(56) References Cited

U.S. PATENT DOCUMENTS 1,701,148 A 2/1929 Dremel
1,729,332 A 9/1929 Dremel
(Continued)

FOREIGN PATENT DOCUMENTS

CN 203460208 3/2014
CN 203471810 3/2014
(Continued)

OTHER PUBLICATIONS

International Search Report and Written Opinion for PCT/US2020/024955 issued Jul. 14, 2020, 14 pages.
(Continued)

*Primary Examiner* — Evan H MacFarlane
(74) *Attorney, Agent, or Firm* — Reinhart Boerner Van Deuren s.c.

(57) ABSTRACT

A blade assembly for a hair cutting apparatus includes a first blade having teeth extending along a first blade edge, and a second blade having teeth extending along a second blade edge. A distance between the first and second blade edges defines a blade gap. A yoke is coupled to the second blade and configured to convert motion of a drive into reciprocation of the second blade relative to the first blade to cut hair. A spring includes a spring base and at least one spring arm configured to reciprocate with the second blade. A guide assembly includes a guide and a spring retainer, the guide being positioned between the first blade and the second blade, and the spring retainer fixing the spring base relative to the first blade, wherein in response to moving the guide relative to the first blade, the blade gap changes.

18 Claims, 12 Drawing Sheets

Related U.S. Application Data continuation of application No. 16/381,340, filed on Apr. 11, 2019, now Pat. No. 11,014,253, which is a continuation-in-part of application No. 15/683,265, filed on Aug. 22, 2017, now Pat. No. 10,322,517, which is a continuation of application No. 14/489,159, filed on Sep. 17, 2014, now Pat. No. 9,770,836.

(58) Field of Classification Search

CPC ..... B26B 19/066; B26B 19/20; B26B 19/205; B26B 19/3846

USPC ......... 30/195, 208, 210, 196, 200, 201, 223, 30/43.91, 43.92

See application file for complete search history.

(56) References Cited

U.S. PATENT DOCUMENTS

| | | | |
|---|---|---|---|
| 2,306,039 | A | 12/1942 | Cromonic |
| 2,790,236 | A | 4/1957 | Andis |
| 2,928,171 | A | 3/1960 | Oster |
| 3,222,782 | A | 12/1965 | Sadlon |
| 3,242,570 | A | 3/1966 | Tietjens |
| 3,589,007 | A | 6/1971 | Walton |
| 3,747,212 | A | 7/1973 | Krayl |
| 4,249,307 | A | 2/1981 | Andis |
| 4,458,417 | A | 7/1984 | Andis |
| 4,825,546 | A | 5/1989 | Araki et al. |
| 5,068,966 | A | 12/1991 | Wahl et al. |
| 5,092,048 | A | 3/1992 | Sukow et al. |
| 5,230,153 | A | 7/1993 | Andis |
| 5,909,929 | A | 6/1999 | Chen |
| 6,260,276 | B1 | 7/2001 | Lebherz et al. |
| 6,308,415 | B1 | 10/2001 | Sablatschan et al. |
| 6,421,922 | B2 | 7/2002 | Beutel et al. |
| 6,502,312 | B2 | 1/2003 | Beutel et al. |
| 7,080,458 | B2 | 7/2006 | Andis |
| 7,703,210 | B2 | 4/2010 | Lau |
| 8,079,149 | B2 | 12/2011 | Bednar |
| 9,770,836 | B2 | 9/2017 | Werner |
| 10,322,517 | B2 | 6/2019 | Werner |
| 2002/0000043 | A1 | 1/2002 | Beutel et al. |
| 2002/0014010 | A1 | 2/2002 | Beutel et al. |
| 2002/0092178 | A1 | 7/2002 | Fung |
| 2006/0042096 | A1 | 3/2006 | Liao |
| 2007/0193034 | A1 | 8/2007 | Oh |
| 2008/0282550 | A1 | 11/2008 | Piwaron |
| 2009/0144988 | A1 | 6/2009 | Lau |
| 2010/0000093 | A1 | 1/2010 | Hwang |
| 2011/0119929 | A1 | 5/2011 | Lau |
| 2011/0265331 | A1 | 11/2011 | Moseman |
| 2012/0144679 | A1 | 6/2012 | Hwang |
| 2012/0272532 | A1 | 11/2012 | Sobagaki et al. |
| 2013/0192068 | A1 | 8/2013 | Kammer et al. |
| 2014/0259689 | A1 | 9/2014 | Lau |
| 2014/0338199 | A1 | 11/2014 | Erickson |
| 2015/0367521 | A1 | 12/2015 | Toy et al. |
| 2016/0279813 | A1 | 9/2016 | Buck, Jr. et al. |
| 2017/0348865 | A1 | 12/2017 | Werner |

FOREIGN PATENT DOCUMENTS

| | | | | |
|---|---|---|---|---|
| CN | 203650556 | | 6/2014 | |
| CN | 105415405 | | 3/2016 | |
| CN | 108712947 | | 10/2018 | |
| DE | 814117 | | 9/1951 | |
| DE | 19708145 | | 8/1998 | |
| EP | 0447131 | | 9/1991 | |
| GB | 2410457 | | 8/2005 | |
| WO | WO-0038889 | A1 * | 7/2000 | ............. B26B 19/06 |
| WO | WO-0200402 | A1 * | 1/2002 | .............. F01B 3/045 |
| WO | WO2017/120610 | | 7/2017 | |

OTHER PUBLICATIONS

State Intellectual Property Office of China, "First Office Action," issued in connection with Chinese Patent Application No. 201510593985.8, dated Mar. 6, 2018, 10 pages.

Andis, "Andis Outliner Trimmer Replacement Blade Set," [http://www.amazon.com/Andis-Outliner-Trimmer-Replacement-Blade/dp/B000A3WXPC], May 29, 2010.

European Patent Office, "Extended European Search Report," issued in connection with European Patent Application No. 15185460.1, dated Feb. 10, 2016, 9 pages.

Extended European Search Report for European Application No. 20787283.9, dated Nov. 11, 2022, 7 pages.

* cited by examiner

BLADE ASSEMBLY HAVING ENTRAPPED SPRING

CROSS-REFERENCE TO RELATED PATENT APPLICATIONS

The present application is a continuation of U.S. application Ser. No. 17/235,398, filed Apr. 20, 2021, which is a continuation of U.S. application Ser. No. 16/381,340, filed Apr. 11, 2019, now U.S. Pat. No. 11,014,253, which is a continuation-in-part of U.S. application Ser. No. 15/683,265, filed Aug. 22, 2017, now U.S. Pat. No. 10,322,517, which is a continuation of U.S. application Ser. No. 14/489,159, filed Sep. 17, 2014, now U.S. Pat. No. 9,770,836, each of which is incorporated herein by reference in their entirety.

BACKGROUND OF THE INVENTION

The present disclosure relates to a blade assembly for a hair cutting apparatus.

SUMMARY OF THE INVENTION

In one embodiment, a blade assembly includes first and second blades with teeth, a yoke, a spring, and a retainer. The first and second blades extend along first and second edges, respectively, which are parallel to each other. The distance between the first blade edge and the second blade edge defines a blade gap that is adjustable. The yoke is coupled to the second blade, and converts motion from a motor into a reciprocation motion of the second blade relative to the first blade. The spring includes a free end and a spring arm extending from the free end. The spring arm biases the second blade towards the first blade. The spring also includes an arcuate-shaped fixed end that extends from the spring arm. The spring also includes a securing arm that extends from the fixed end. The retainer includes an arch that interfaces against the spring to trap the spring towards the first blade.

In another embodiment, a blade assembly for a hair cutting apparatus includes first and second blades, a yoke, a spring, and a retainer. The first and second blades have first and second edges, respectively, which are parallel to each other. The distance between the edges is defines a blade gap. The yoke is coupled to the second blade and reciprocates the second blade relative to the first blade. The spring includes at least two free ends, a spring arm for each free end, a fixed end for each spring arm, a securing arm for each fixed end, and a spring base that extends between the securing arms. The spring arms extend from a respective free end and bias the second blade towards the first blade. The first ends extends from the spring arms, and the securing arm extends from the fixed ends. The retainer defines a plurality of arches that interface against the spring to trap the spring towards the first blade.

In another embodiment a blade assembly for a hair cutting apparatus includes first and second blades, a yoke, a spring, and a retainer. The first and second blades have first and second edges, respectively, which are parallel to each other. The distance between the edges is defines a blade gap. The yoke is coupled to the second blade and reciprocates the second blade relative to the first blade. The spring includes two free ends, two spring arms extending from the two free ends, one per. The spring arms bias the second blade towards the first blade. The spring also includes two fixed ends extending from the spring arms, and two securing arms extending from the fixed ends. A spring base extends between the two securing arms. The retainer defines a plurality of arches that interface against the spring to trap the spring towards the first blade.

In one construction, the disclosure provides a blade assembly for a hair cutting apparatus, the blade assembly comprising: a first blade having teeth extending along a first blade edge; a second blade positioned proximate the first blade, the second blade having teeth extending along a second blade edge parallel to the first blade edge and offset from the first blade edge by a blade gap; a yoke coupled to the second blade, the yoke adapted to convert motion of a drive mechanism into reciprocation of the second blade with respect to the first blade to cut hair between the teeth of the first and second blades; a spring having a spring base and at least one spring arm coupled to one of the yoke and second blade, the spring arm reciprocating with the second blade with respect to the first blade; and a spring retainer mounted to the first blade and fixing the spring base with respect to the first blade to prevent relative movement between the spring base and the first blade during reciprocation of the second blade and spring arm with respect to the first blade; wherein the spring arm applies a biasing force on the second blade toward the first blade to maintain the first and second blades in an operational condition when separated from the hair cutting apparatus.

In some constructions the blade assembly further comprises a guide secured to the first blade and sandwiched between the first and second blades, the guide restricting movement of the second blade perpendicular to the first blade edge to maintain a desired blade gap. In some constructions the blade assembly further comprises a slot in the guide; and a fastener secured to the first blade and extending through the slot; wherein the blade gap is adjustable by moving the guide within a range of adjustability defined by the fastener abutting opposite ends of the slot; wherein a desired blade gap is achieved by tightening the fastener to fix the guide to the first blade with the guide in a position corresponding to the desired blade gap. In some constructions the spring and second blade are movable with the guide, such that the first and second blades are maintained in the operational condition during adjustment of the blade gap. In some constructions the spring retainer includes a portion of the guide, such that the guide serves a first purpose of maintaining the desired blade gap and a second purpose of fixing the spring base with respect to the first blade. In some constructions the guide is T-shaped, having a guide base extending perpendicular to the first blade edge and a cross portion extending parallel to the first blade edge; wherein the guide base includes the spring retainer. In some constructions the spring base is held against the first blade by the spring retainer; and wherein the spring arm includes a fixed end integral with the spring base and a free end coupled to one of the yoke and second blade; wherein the spring arm pivots about the fixed end during reciprocation of the second blade; and wherein neither the spring base nor the spring arm includes a compliance coil to accommodate reciprocation of the second blade.

In another construction, the disclosure provides a blade assembly for a hair cutting apparatus, the blade assembly comprising: a first blade having teeth extending along a first blade edge; a second blade positioned proximate the first blade, the second blade having teeth extending along a second blade edge parallel to the first blade edge and offset from the first blade edge by a blade gap; a yoke coupled to the second blade, the yoke adapted to convert motion of a drive mechanism into reciprocation of the second blade with respect to the first blade to cut hair between the teeth of the first and second blades; a spring biasing the second blade toward the first blade to maintain the first and second blades in an operational condition when separated from the hair cutting apparatus; a fastener secured to the first blade; and a guide having a slot, the fastener extending through the slot; wherein the blade gap is adjustable by moving the guide within a range of adjustability defined by the fastener abutting opposite ends of the slot; wherein a desired blade gap is achieved by tightening the fastener to fix the guide to the first blade with the guide in a position corresponding to the desired blade gap; wherein the blade gap is adjusted with the spring maintaining the first and second blades in the operational condition while separated from the hair cutting apparatus.

In some constructions the spring includes a spring base and at least one spring arm coupled to one of the yoke and second blade, the spring arm reciprocating with the second blade with respect to the first blade; the blade assembly further comprising a spring retainer mounted to the first blade and fixing the spring base with respect to the first blade to prevent relative movement between the spring base and the first blade during reciprocation of the second blade with respect to the first blade. In some constructions a portion of the guide serves as the spring retainer.

In another construction, the disclosure provides a blade assembly for a hair cutting apparatus, the blade assembly comprising: a first blade having teeth extending along a first blade edge; a second blade positioned proximate the first blade, the second blade having teeth extending along a second blade edge parallel to the first blade edge; a yoke coupled to the second blade, the yoke adapted to convert motion of a drive mechanism into reciprocation of the second blade with respect to the first blade to cut hair between the teeth of the first and second blades; and a spring having a spring base and at least one spring arm extending from the spring base to one of the yoke and second blade, the spring base being fixed with respect to the first blade, the spring arm including a fixed end integral with the spring base and a free end coupled to one of the yoke and second blade, the spring arm pivoting about the fixed end to accommodate reciprocation of the second blade; wherein neither the spring base nor the spring arm includes a compliance coil to accommodate reciprocation of the second blade.

In some constructions the blade assembly further comprises a guide secured to the first blade and sandwiched between the first and second blades, the guide restricting movement of the second blade perpendicular to the first blade edge to maintain a desired blade gap. In some constructions the blade assembly further comprises a slot in the guide; and a fastener secured to the first blade and extending through the slot; wherein the blade gap is adjustable by moving the guide within a range of adjustability defined by the fastener abutting opposite ends of the slot; wherein a desired blade gap is achieved by tightening the fastener to fix the guide to the first blade with the guide in a position corresponding to the desired blade gap. In some constructions the spring and second blade are movable with the guide, such that the first and second blades are maintained in an operational condition during adjustment of the blade gap. In some constructions the blade assembly further comprises a spring retainer incorporated into the guide, the spring retainer fixing the spring base with respect to the first blade.

In another construction, the disclosure provides a blade assembly for a hair cutting apparatus, the blade assembly comprising: a first blade having teeth extending along a first blade edge; a second blade positioned proximate the first blade, the second blade having teeth extending along a second blade edge parallel to the first blade edge and offset from the first blade edge by a blade gap; a yoke coupled to the second blade, the yoke adapted to convert motion of a drive mechanism into reciprocation of the second blade with respect to the first blade to cut hair between the teeth of the first and second blades; a spring having a spring base and at least one spring arm coupled to one of the yoke and second blade, the spring arm reciprocating with the second blade with respect to the first blade, the spring arm applying a biasing force on the second blade toward the first blade; and a guide secured to the first blade and sandwiched between the first and second blades, the guide restricting movement of the second blade perpendicular to the first blade edge to maintain a desired blade gap, the guide being mounted to the first blade and fixing the spring base with respect to the first blade to prevent relative movement between the spring base and the first blade during reciprocation of the second blade with respect to the first blade.

In some constructions the guide traps the spring base against the first blade. In some constructions, the blade assembly further comprises a slot in the guide; and a fastener secured to the first blade and extending through the slot; wherein the blade gap is adjustable by moving the guide within a range of adjustability defined by the fastener abutting opposite ends of the slot; wherein a desired blade gap is achieved by tightening the fastener to fix the guide to the first blade with the guide in a position corresponding to the desired blade gap. In some constructions the spring and second blade are movable with the guide, such that the first and second blades are maintained in an operational condition during adjustment of the blade gap with the blade assembly separated from the hair cutting apparatus.

In another construction, the disclosure provides a method for adjusting a blade gap of a blade assembly for a hair cutting apparatus, the blade assembly including first and second blades having parallel blade edges separated by the blade gap, a spring maintaining the first and second blades in an operational condition, and a spring retainer fixing a portion of the spring to the first blade, the method comprising: removing the blade assembly from the hair cutting apparatus; with the first and second blades in the operational condition, moving the spring retainer and spring perpendicular to the blade edges; and in response to moving the spring retainer and spring, moving the second blade with respect to the first blade to adjust the blade gap while maintaining the first and second blades in the operational condition.

In another construction, the blade assembly for a hair cutting apparatus includes a first blade having teeth extending along a first blade edge, and a second blade having teeth extending along a second blade edge parallel to the first blade edge. A distance between the first and second blade edges defines a blade gap. A yoke is coupled to the second blade and configured to convert motion of a drive into reciprocation of the second blade relative to the first blade to cut hair. A spring includes a spring base and at least one spring arm configured to reciprocate with the second blade. A guide assembly includes a guide and a spring retainer, the guide being positioned between the first blade and the second blade, and the spring retainer fixing the spring base relative to the first blade, wherein in response to moving the guide relative to the first blade, the blade gap changes.

In another construction, the blade assembly for a hair cutting apparatus includes a first blade having teeth extending along a first blade edge, a second blade having teeth extending along a second blade edge, a distance between the first blade edge and the second blade edge defining a blade gap. A biasing member is configured to apply a biasing force on the second blade towards the first blade, and a guide includes a guide base and a cross portion, the cross portion positioned between the first blade and the second blade, the guide configured to move the second blade relative to the first blade to change the blade gap, and the second blade configured to reciprocate relative to the cross portion of the guide.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplar

BRIEF DESCRIPTION OF THE DRAWINGS

This application may be more fully understood from the following detailed description, taken in conjunction with the accompanying figures, wherein like reference numerals refer to like elements in which.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
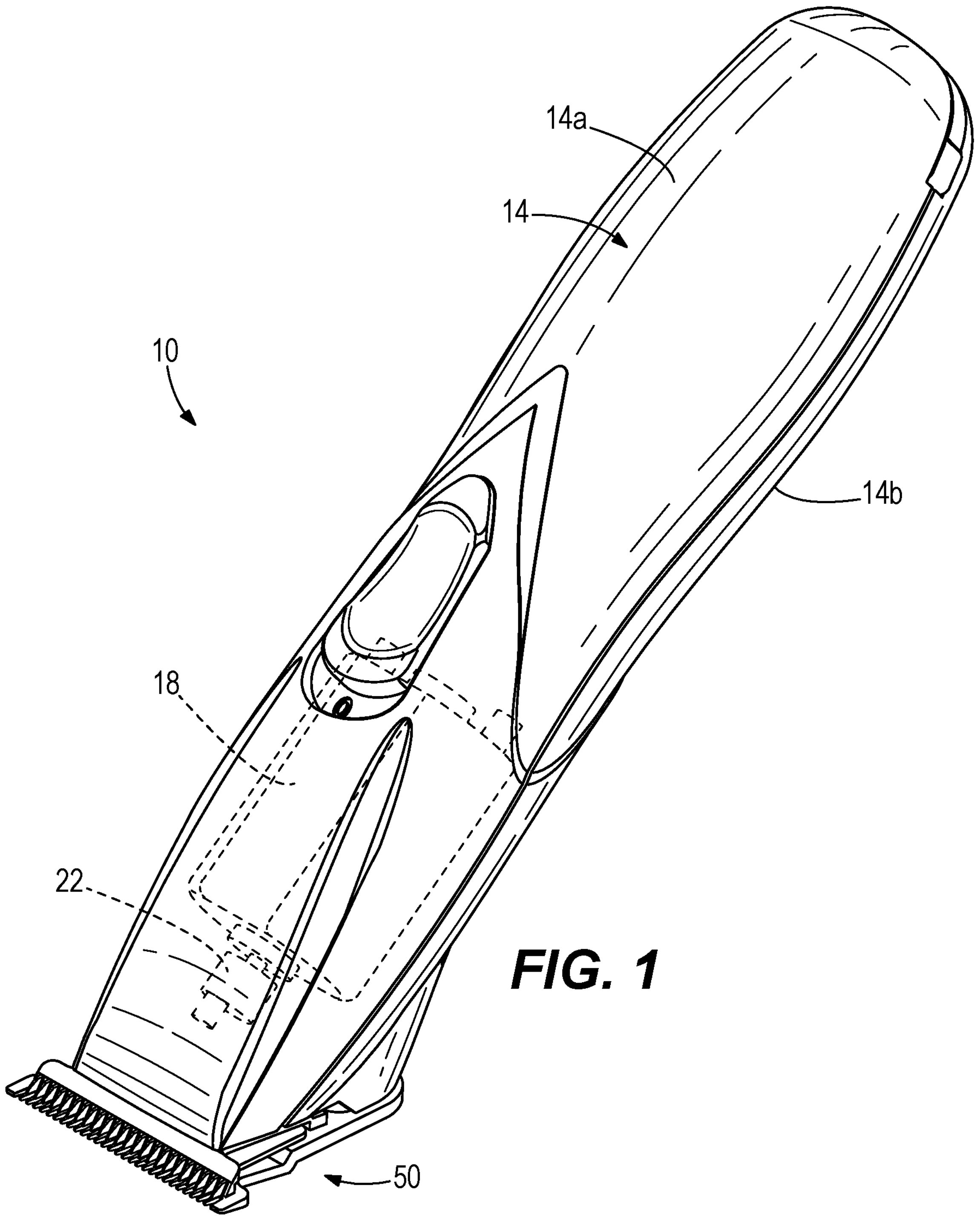
FIG. 1 is a perspective view of a hair cutting apparatus incorporating a blade assembly according to the present disclosure.
Figure 2:
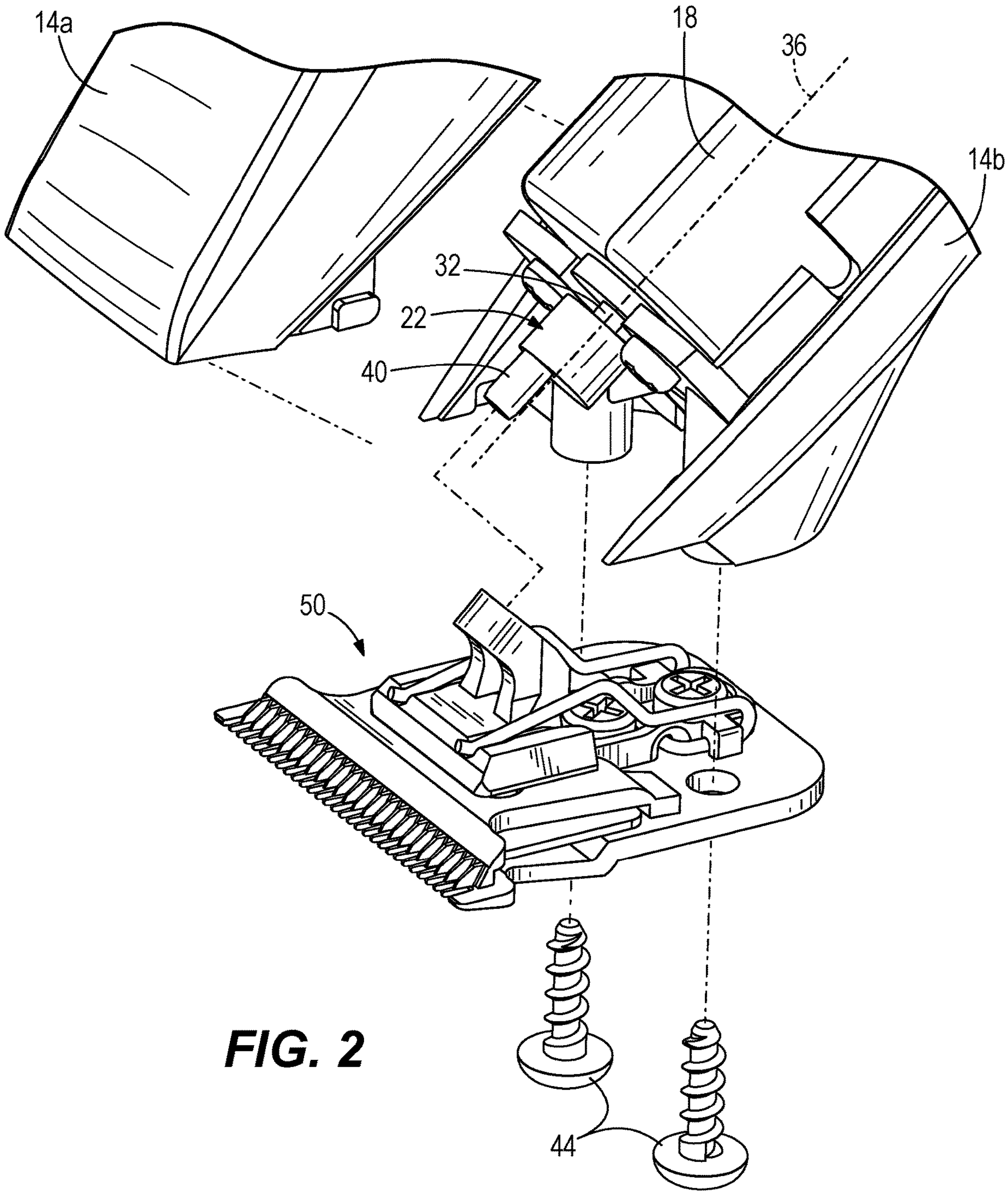
FIG. 2 is a partially exploded view with the blade assembly removed from rest of the hair cutting apparatus.

FIGS. 1 and 2 illustrate a hair cutting apparatus 10, such as a trimmer or clipper, having a housing 14, an electric motor 18, a drive mechanism 22, and a blade assembly 50. The housing 14 may be a clamshell configuration as illustrated, with top and bottom portions 14*a*, 14*b* that surround the motor 18 and drive mechanism 22, or can be in any other suitable configuration. The electric motor 18 can operate with power from batteries or electricity from an outlet, and includes a rotating motor output shaft 32 that rotates about an axis of rotation 36. The drive mechanism 22 includes an eccentric drive 40 that is offset from the axis of rotation 36 of the motor output shaft 32. The blade assembly 50 is secured to the hair cutting apparatus housing 14 by way of a pair of housing fasteners 44.

Figure 3:
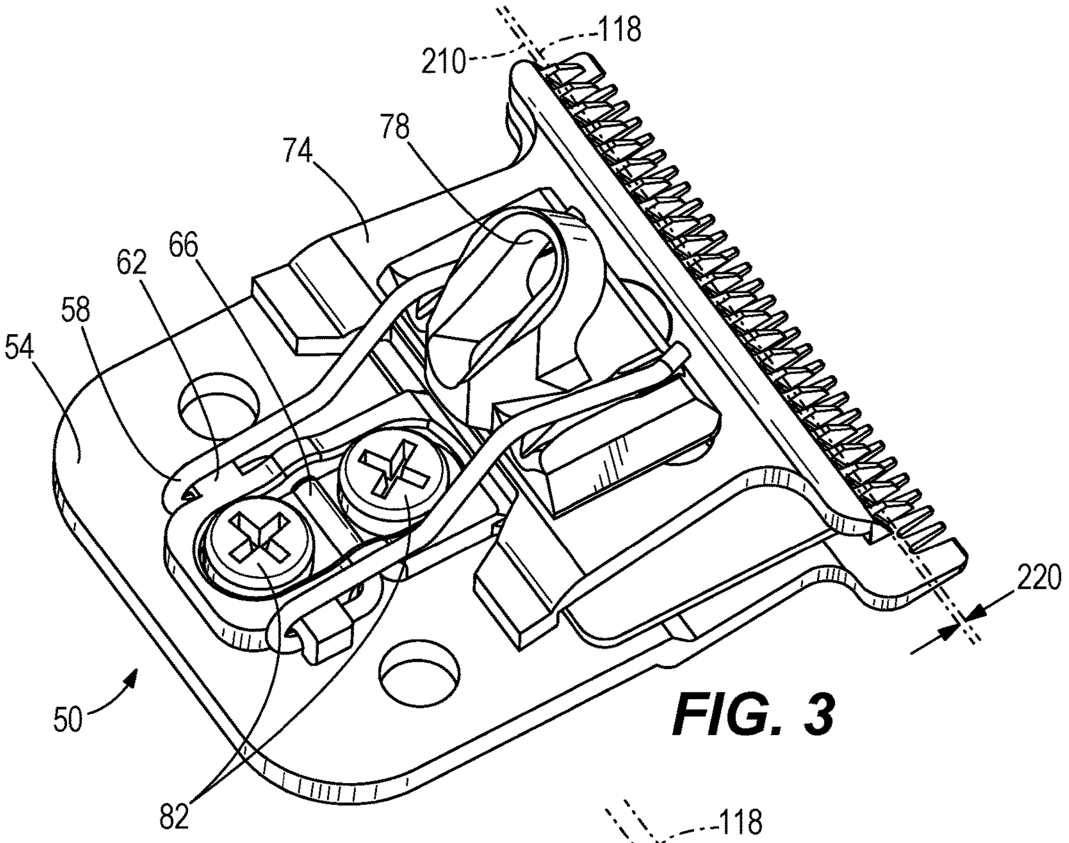
FIG. 3 is perspective view of the blade assembly in a minimum blade gap setting.
Figure 4:
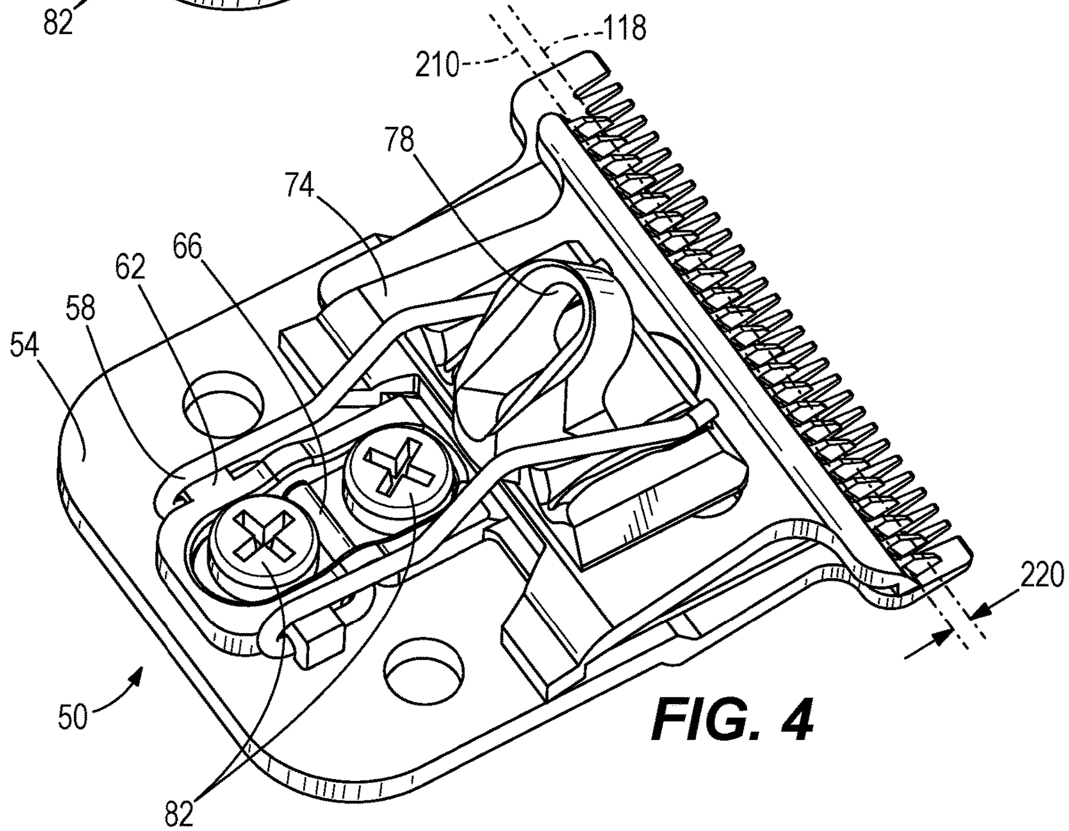
FIG. 4 is a perspective view of the blade assembly in a maximum blade gap setting.
Figure 5:
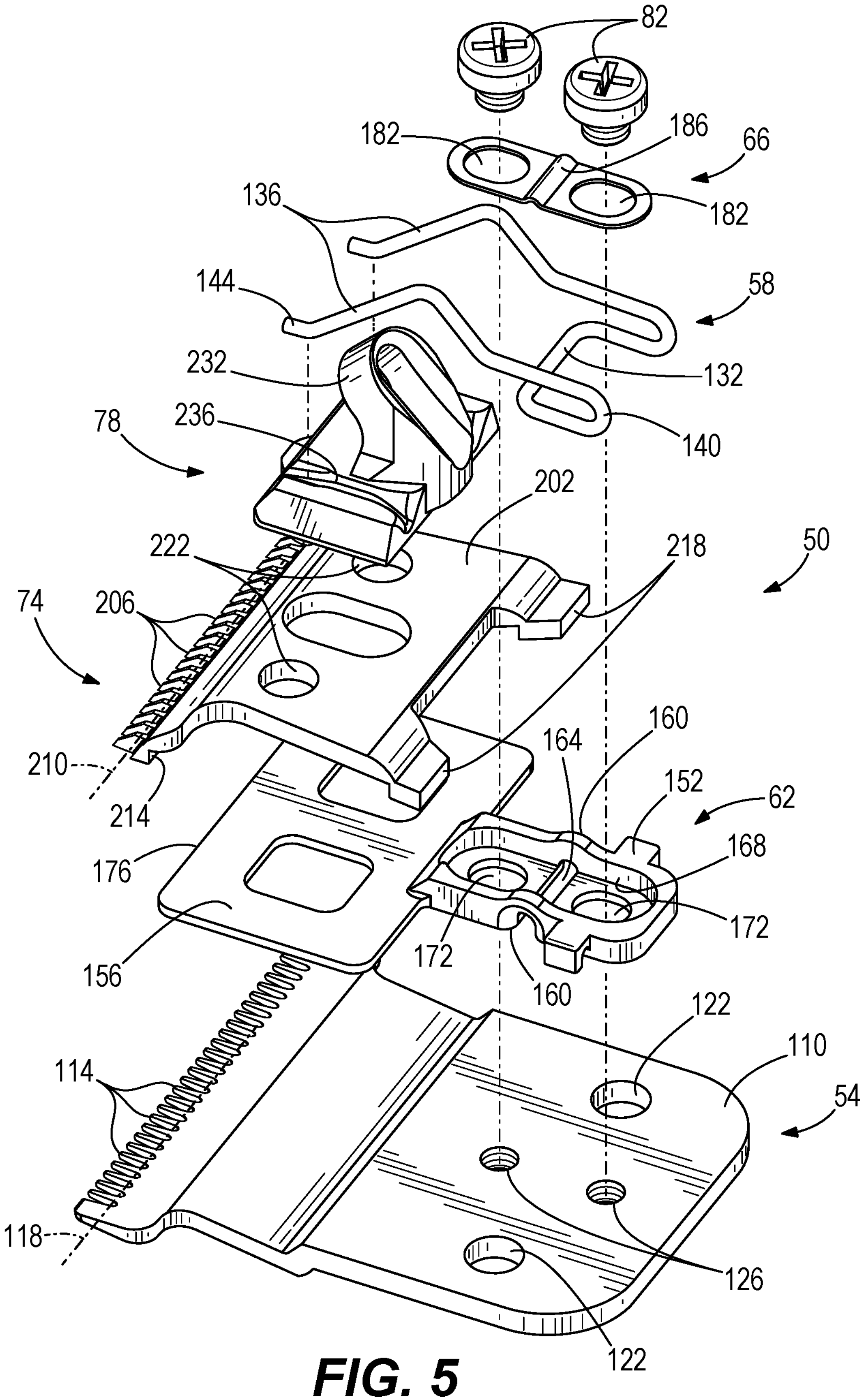
FIG. 5 is an exploded view of the blade assembly.

FIGS. 3-5 illustrate the blade assembly 50, which includes a lower blade 54, a spring 58, a guide 62, a washer 66, an upper blade 74, a yoke 78, and a pair of guide fasteners 82. It will be understood that the hair cutting apparatus 10 may be moved, turned, positioned, and oriented in many different angles and directions during operation. For the purpose of consistency and clarity, positional terms such as up, above, upward, upper, down, below, beneath, downward, lower, front, forward, rear, rearward are used in this detailed description with respect to the operating position of the hair cutting apparatus 10 illustrated in FIG. 1.

The lower blade 54, which can also be referred to as a first blade, includes a main body 110 and a plurality of lower blade teeth 114. The lower blade teeth 114 extend along a nominal lower blade edge 118, which may be defined, for example, by a line connecting the roots of the teeth 114. The lower blade 54 also includes a pair of through-holes 122 for mounting the blade assembly 50 to the housing 14 with the housing fasteners 44, and a pair of threaded holes 126 for receiving the guide fasteners 82.

The spring 58 includes a U-shaped spring base 132 and a pair of spring arms 136 extending generally parallel to each other from the spring base 132. Each spring arm 136 has a fixed end 140 integral with the spring base 132 and a free end 144 coupled to the yoke 78 or upper blade 74. The spring base 132 sits against the main body 110 of the lower blade 54 and is held in place by the guide 62. In this regard, the guide 62 may also be referred to as a spring retainer. The guide 62 fixes the spring base 132 with respect to the lower blade 54 to prevent relative movement between the spring base 132 and the lower blade 54 during reciprocation of the spring arms 136, upper blade 74, and yoke 78 with respect to the lower blade 54.

The guide 62 is a T-shaped piece that is mounted to the lower blade 54 and includes a guide base 152 and a cross portion 156. The guide base 152 includes a pair of arches 160 and an arched tunnel 164, all opening toward the lower blade 54, to accommodate and trap the spring base 132 against the lower blade 54. The guide base 152 therefore incorporates a spring retainer. The guide base 152 includes a washer recess 168 and a pair of slots 172 extending parallel to the major axis of the guide base 152 and perpendicular to the major axis of the cross portion 156. The cross portion 156 includes a guide edge 176 parallel to the lower blade edge 118 when the guide 62 is installed on the lower blade 54. The guide 62 performs two functions: guiding reciprocating movement of the upper blade 74 with the guide edge 176 and retaining the spring 58 against the body 110 of the lower blade 54 with the guide base 152.

The washer 66 sits in the washer recess 168 in the guide base 152. The washer 66 includes a pair of slots 182 that align with the slots 172 in the guide base 152. The washer 66 also includes an arched portion 186 to accommodate the arched tunnel 164 in the guide base 152. The guide fasteners 82 extend through the slots 182, 172 in the washer 66 and guide base 152, respectively, and thread into the threaded holes 126 in the main body 110 of the lower blade 54. With the guide fasteners 82 tightened down against the washer 66 and guide base 152, the spring base 132 is trapped against and fixed with respect to the lower blade 54.

The upper blade 74, which may also be referred to as the second blade, sits on top of the lower blade 54 and guide 62. The guide 62 is sandwiched between the upper and lower blades 74, 54. The upper blade 74 includes a main body 202 and a plurality of upper blade teeth 206. The upper blade teeth 206 extend along a nominal upper blade edge 210, which may be defined, for example, by a line connecting the roots of the teeth 206. The upper blade 74 is positioned proximate the lower blade 54 with the upper blade edge 210 parallel to and offset from the lower blade edge 118. Rearward of the upper blade edge 210, on the bottom side of the upper blade 74, is a depending guide surface 214 that is parallel to the upper blade edge 210 and that engages the guide edge 176. The guide edge 176 restricts movement of the upper blade 74 perpendicular to the lower blade edge 118.

The engagement of the guide surface 214 against the guide edge 176 guides movement of the upper blade 74 parallel to the blade edge 118 of the lower blade 54. This engagement maintains a consistent blade gap 220 (FIGS. 3 and 4) between the parallel upper and lower blade edges 210, 118 as the upper blade 74 reciprocates with respect to the lower blade 54. The blade gap 220 refers to a forward-rearward offset of the blade edges 118, 210 and not a vertical separation; the upper blade teeth 206 are immediately adjacent or proximate the lower blade teeth 114 to perform a shearing function. The guide 62 therefore serves the purpose of maintaining a constant blade gap 220 in addition to fixing the spring base 132 with respect to the lower blade 54.

A pair of feet 218 depend from the rear end of the upper blade body 202. The feet 218 straddle the guide base 152 and sit on the body 110 of the lower blade 54. The feet 218 create a vertical gap between the rear edges of the upper and lower blades 74, 54, such that the guide base 152 can extend rearward through the vertical gap. The distance between the feet 218 provides sufficient room for the upper blade 74 to reciprocate with respect to the lower blade 54 and the guide 62, without the feet 218 hitting the guide base 152. The upper blade body 202 includes a pair of holes 222 for coupling the upper blade 74 with the yoke 78.

The yoke 78 sits on top of the upper blade 74. A pair of pair of pegs depending from the bottom of the yoke 78 are inserted into the holes 222 in the main body 202 of the upper blade 74 so that the yoke 78 is coupled to the upper blade 74. The yoke 78 includes a receiver 232 for receiving the eccentric drive 40 of the drive mechanism 22. The yoke 78 also includes channels or grooves 236 on opposite sides of the receiver 232.

The channels 236 receive the free ends 144 of the spring arms 136, such that the free ends 144 can apply a downward biasing force on the yoke 78 and slide forward and rearward within the channels 236 as the yoke 78 and upper blade 74 reciprocate with respect to the lower blade 54. The yoke 78 is adapted to convert motion of the drive mechanism 22 into reciprocation of the upper blade 74 with respect to the lower blade 54 to cut hair between the teeth 114, 206 of the lower and upper blades 54, 74. In alternative configurations, the spring arms 136 may be coupled at their free ends 144 to the upper blade 74 rather than the yoke 78.

The blade assembly 50 is assembled by stacking the spring 58, guide 62, washer 66, upper blade 74, and yoke 78 on the lower blade 54, and then extending the guide fasteners 82 through the slots 182, 172 of the washer 66 and guide 62 and threading the guide fasteners 82 into the threaded holes 126 in the lower blade 54. The free ends 144 of the spring arms 136 are positioned in the channels 236 of the yoke 78. The spring 58 applies a downward biasing force on the yoke 78 and an upward biasing force on the lower blade 54 to draw the yoke 78 and lower blade 54 toward each other. These biasing forces of the spring 58 sandwich the upper blade 74 between the yoke 78 and lower blade 54. The spring 58 may be characterized as a tension spring because when the blade assembly 50 is assembled, the spring arms 136 and spring base 132 are separated from each other wider than their at-rest position or relationship, and the spring 58 is attempting to draw or pull the spring arms 136 and spring base 132 back to the at-rest position.

The guide fasteners 82 and slots 182, 172 define a range of adjustability for the guide 62 with respect to the lower blade 54, and therefore a range of adjustability for the blade gap 220. The guide 62 may be moved perpendicularly toward the lower blade edge 118 until one of the guide fasteners 82 abuts an end of the slot 182 or 172 in which it is positioned, at which point the guide 62 is prevented by the guide fastener 82 from moving any further in that direction with respect to the lower blade 54. The same is true in the opposite direction, perpendicularly away from the lower blade edge 118—the guide 62 may be move until one of the guide fasteners 82 abuts an end of the slot 182 or 172 in which it is positioned, at which point the guide 62 is prevented from moving any further in such opposite direction with respect to the lower blade 54. The range of adjustability is therefore defined by a guide fastener 82 abutting one end or the opposite end of the slot 182 or 172 in which it resides. It is possible for one fastener 82 to define the limit of forward adjustability and the other fastener 82 to define the limit of rearward adjustability. The position of the guide 62 with respect to the lower blade 54 (and therefore the blade gap 220) can be adjusted by loosening the guide fasteners 82, moving the guide 62 within the range of adjustability, and tightening the guide fasteners 82 when the guide 62 is in a desired position and a desired blade gap 220 is achieved.

The position of the guide 62 corresponds to or defines the width of the blade gap 220 because the guide 62 is fixed with respect to the lower blade 54, and the upper blade 74 reciprocates along the guide edge 176. When the guide 62 is adjusted to the forward limit (FIG. 3) in the range of adjustability, the blade gap 220 is minimized and when the guide 62 is adjusted to the rear limit (FIG. 4) in the range of adjustability, the blade gap 220 is maximized. The blade gap 220 determines the length to which the hair cutting apparatus 10 will cut hair; the smaller the blade gap 220, the shorter the length to which the hair will be cut.

As illustrated in FIGS. 3 and 4, the blade gap 220 can be adjusted with the blade assembly 50 fully assembled. This is because the spring 58 is carried by the lower blade 54 and is held in place with the guide 62, and because the fasteners 82 are accessible while the blade assembly 50 is assembled. The spring arms 136 apply a biasing force on the upper blade 74 and yoke 78 toward the lower blade 54 to maintain the blade assembly 50 in the operational condition when attached to the housing 14 and when it is detached or separated from the housing 14. When detached from the housing 14, the upper blade 74 can be manually reciprocated by one holding the lower blade 54 and moving the upper blade 74 or yoke 78 back and forth parallel to the blade edges 118, 210. When attached to the housing 14, the lower blade 54 is fixed with respect to the housing 14 and the yoke 78 receives the eccentric drive 40, which drives reciprocation of the yoke 78 and upper blade 74 with respect to the lower blade 54.

Once assembled and adjusted to a desired blade gap 220, the blade assembly 50 is attached to the housing 14 with the housing fasteners 44. As the blade assembly 50 is aligned with the mounting holes on the housing 14 so that the housing fasteners 44 can be threaded into the housing, the eccentric drive 40 aligns with and is received within the receiver 232. When the motor 18 is energized, the eccentric drive 40 orbits around the motor output shaft axis of rotation 36. The orbital movement of the eccentric drive 40 is converted into translational (specifically, reciprocating) movement of the yoke 78 and upper blade 74 with respect to the lower blade 54 (which is held stationary with respect to the housing 14 by the housing fasteners 44).

As the yoke 78 and upper blade 74 reciprocate with respect to the lower blade 54, the spring base 132 is fixed with respect to the lower blade 54 and the spring arms 136 wave back and forth in parallel with each other. More specifically, the fixed ends 140 of the spring arms 136 remain substantially fixed with respect to the lower blade 54, the spring arms 136 pivot about the fixed ends 140 during reciprocation of the upper blade 74 and yoke 78, and the free ends 144 describe arcs. The arcuate movement of the free ends 144 is converted into translational movement of the yoke 78 and upper blade 74 as the free ends 144 are free to move forward and rearward in the channels 236 with respect to the yoke 78, but are restrained from moving side-to-side within the channels 236. In other words, the channels 236 couple the free ends 144 and the yoke 78 for side-to-side movement, but decouple the free ends 144 from the yoke 78 for relative forward and rearward movement.

The spring arms 136 are of sufficient length (measured from the fixed ends 140 to the free ends 144) to accommodate the full range of reciprocating motion of the upper blade 74 and yoke 78 with respect to the lower blade 54. In known configurations, the spring arms are typically relatively short because of the positioning of the spring base in the blade assembly, and the spring often requires compliance coils in the base or arms to accommodate some of the reciprocating motion. The present disclosure requires no compliance coil in the spring base 132 or in the spring arms 136 to accommodate reciprocation of the upper blade 74 with respect to the lower blade 54.

The blade gap 220 is adjusted by removing the housing fasteners 44, adjusting the blade gap 220, and reattaching the blade assembly 50 to the housing 14 with the housing fasteners 44. The upper blade 74 and yoke 78 move with respect to the lower blade 54 in response to movement of the spring 58 and guide 62 with respect to the lower blade 54. Because the spring 58, upper blade 74, and yoke 78 are movable with the guide 62, while the blade assembly 50 is maintained in the operational condition, the operator can see the actual blade gap 220 during the adjustment. This is distinguished from known configurations in which the upper blade is not maintained on the lower blade when the lower blade is removed from the housing, and in which the operator must therefore guess at the actual blade gap 220 setting when adjusting the guide on the lower blade. The operator using such known configurations is not certain of what the actual blade gap 220 will look like until the blade assembly is actually reassembled (often by reattaching the lower blade to the rest of the blade assembly that is still connected to the housing).

Thus, the disclosure provides, among other things, a blade assembly having an entrapped spring to hold the upper and lower blades in an operational condition and an adjustable guide member for adjusting the blade gap while the upper and lower blades are held in the operational condition. Various features and advantages of the disclosure are set forth in the following claims.

Figure 6:
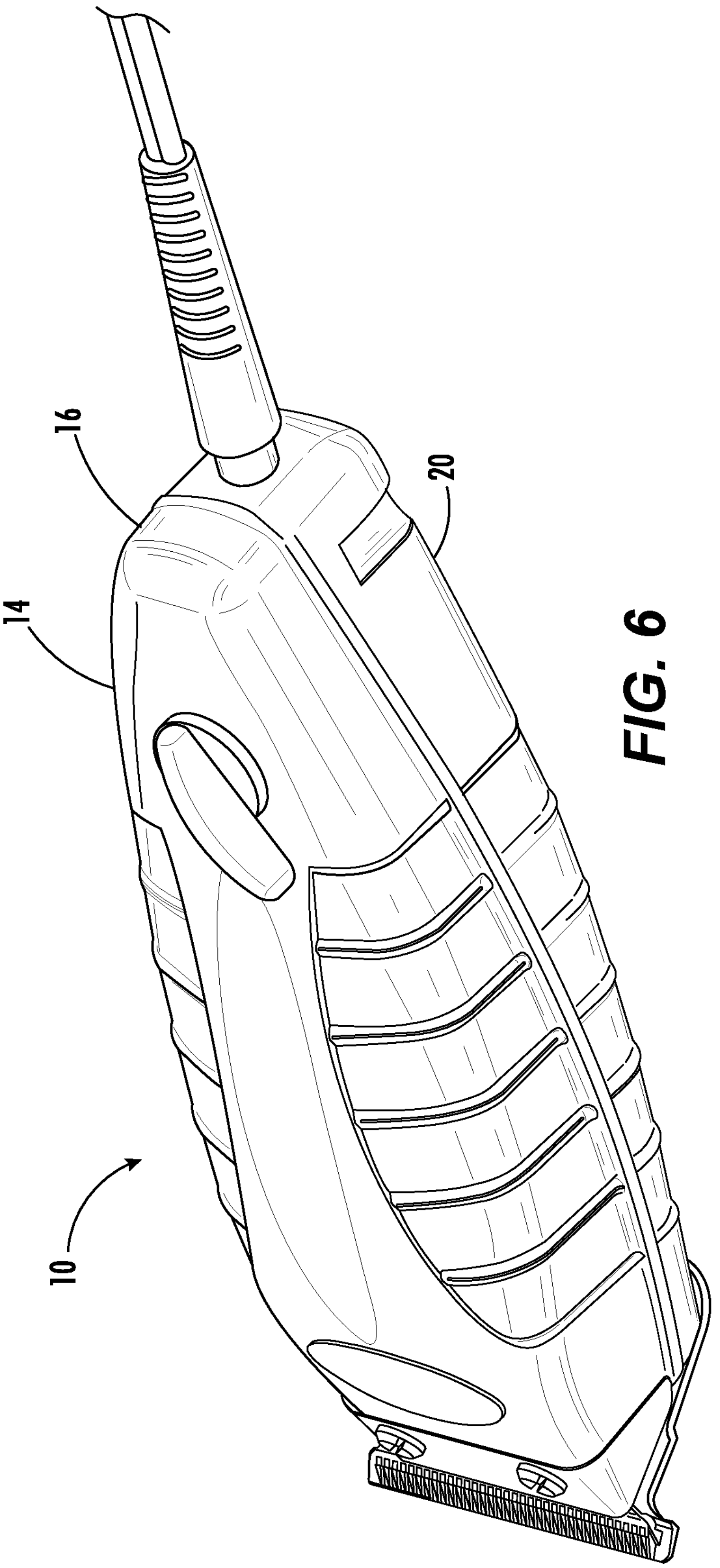
FIG. 6 is a perspective view of a hair cutting apparatus incorporating a blade assembly according to an embodiment.
Figure 7:
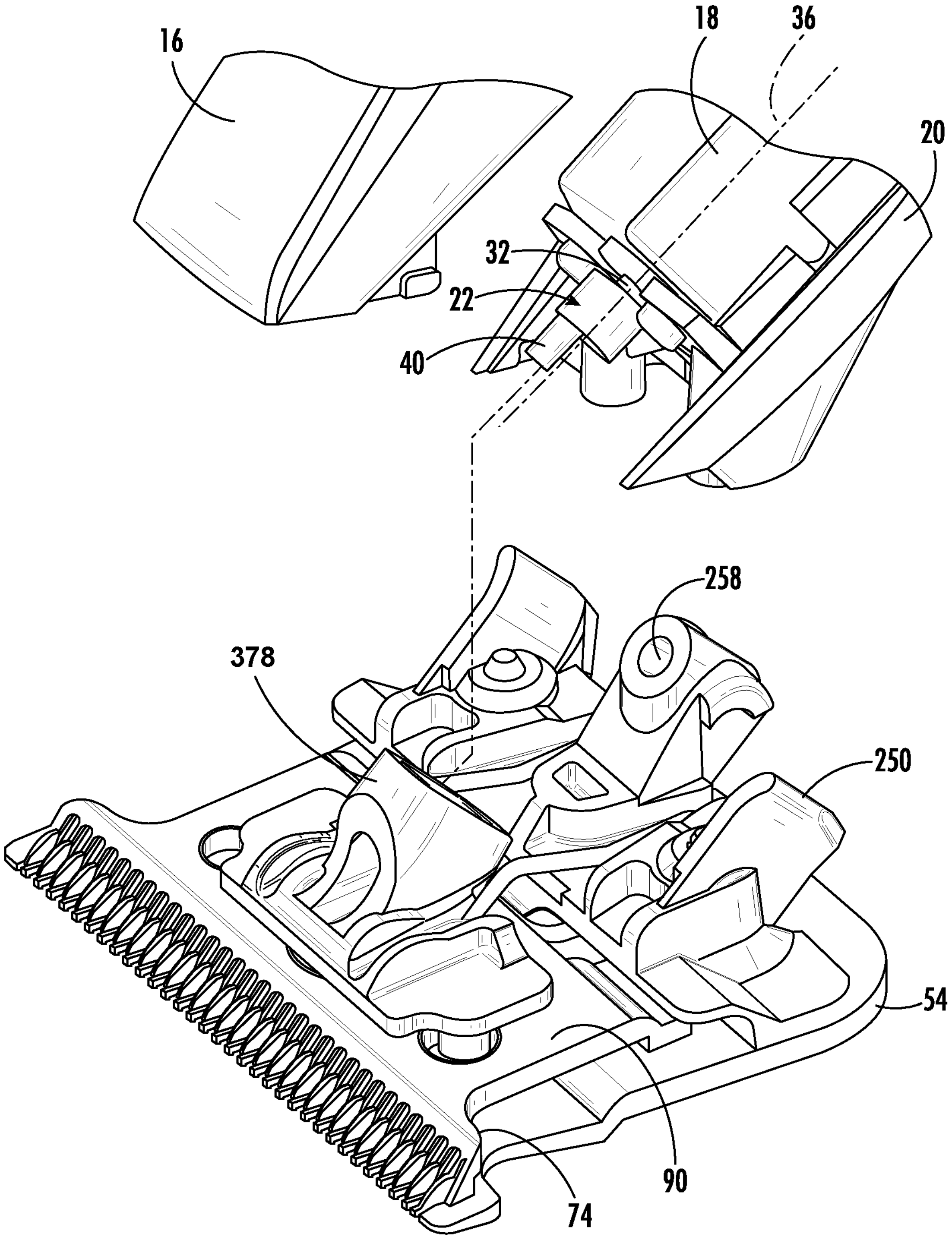
FIG. 7 is a partially exploded view of a blade assembly according to an embodiment.
Figure 8:
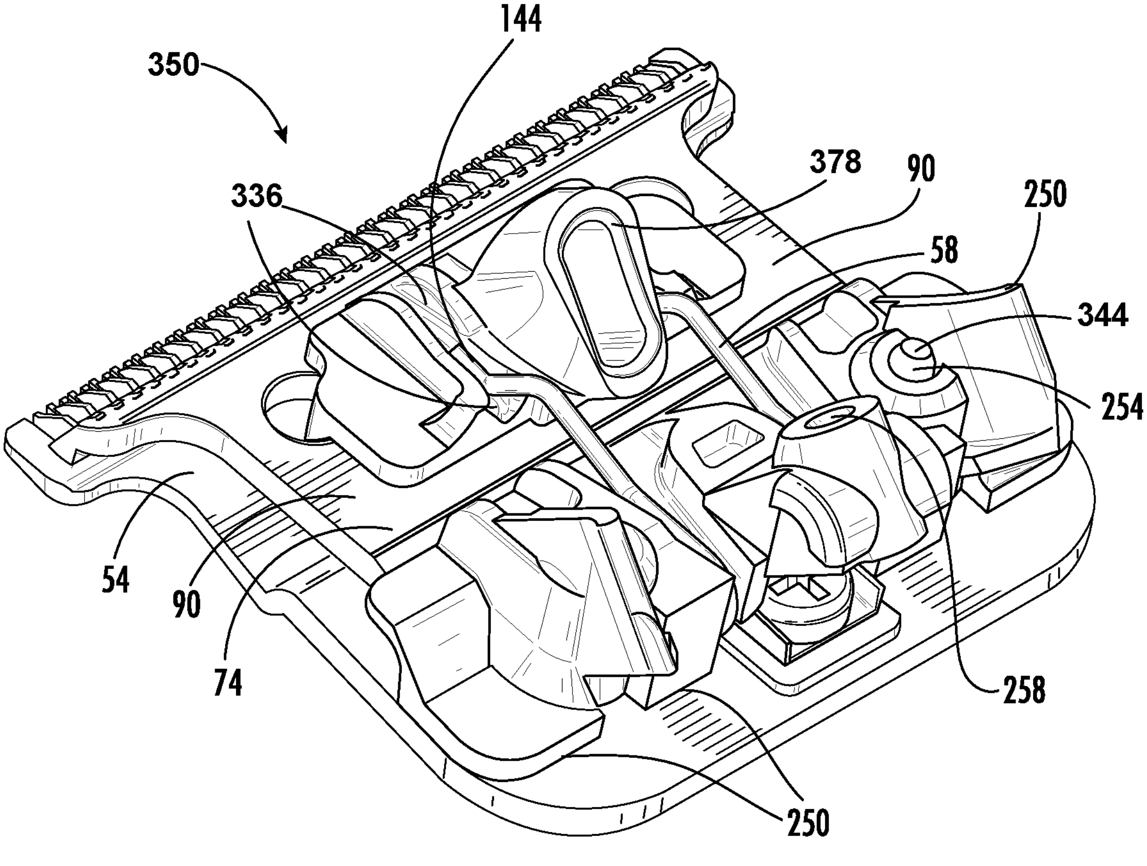
FIG. 8 is a perspective view of a blade assembly according to an embodiment.
Figure 9:
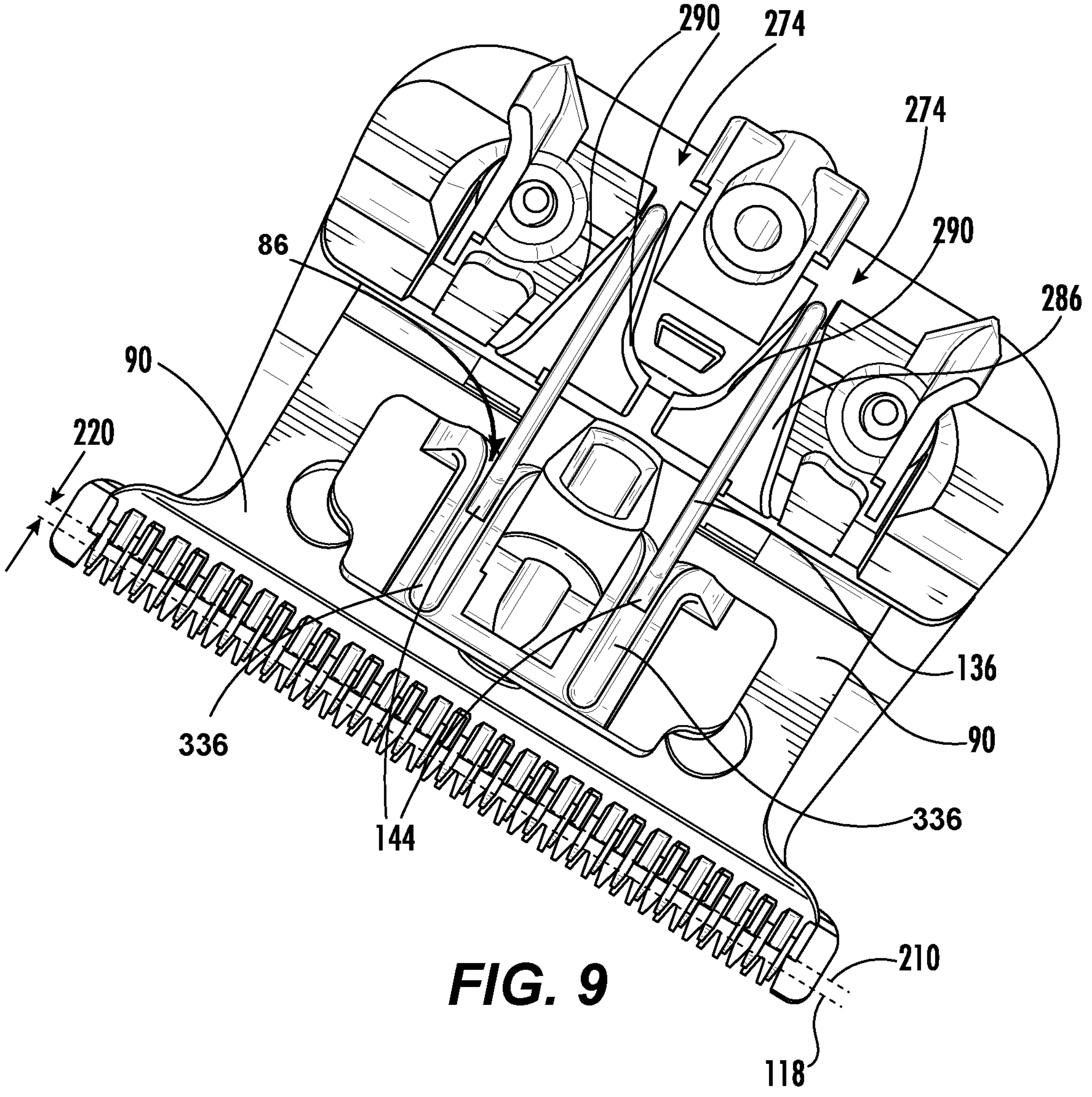
FIG. 9 is a top-perspective view of a blade assembly according to an embodiment.
Figure 10:
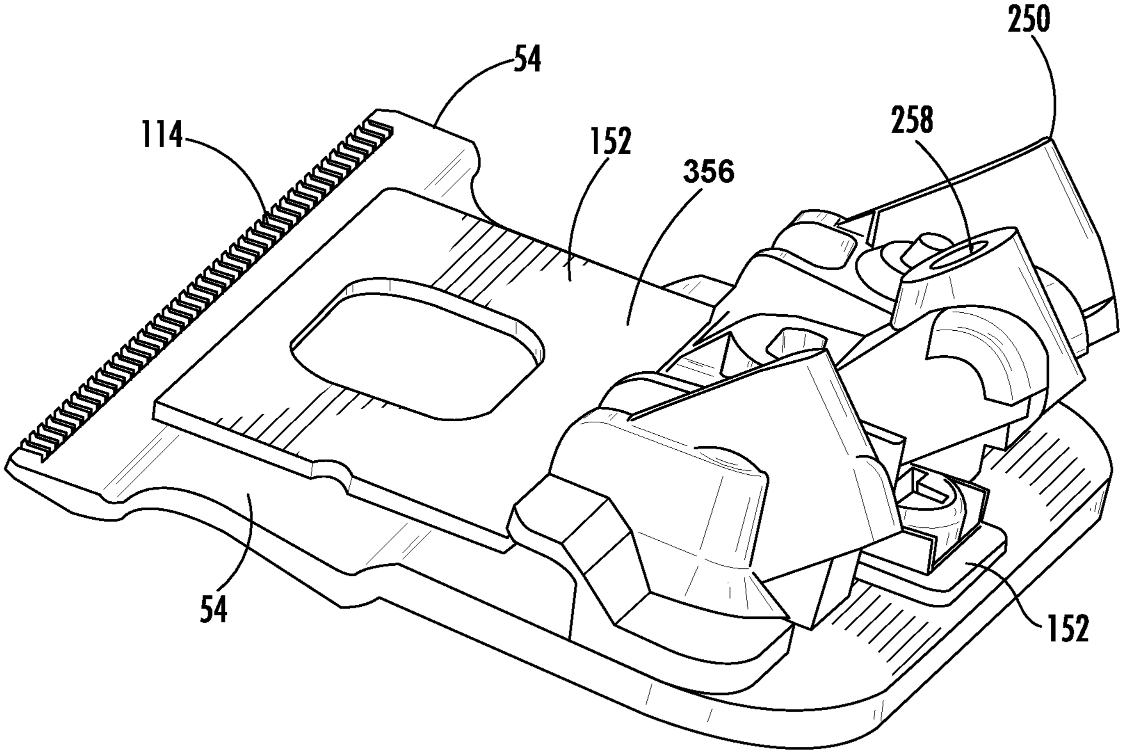
FIG. 10 is a perspective view of a portion of a blade assembly according to an embodiment.

Referring now to FIGS. 6-13, illustrated therein is another embodiment of hair cutting apparatus 10. FIGS. 6 and 7 illustrate a hair cutting apparatus 10, such as a trimmer or clipper, comprising housing 14, electric motor 18, drive mechanism 22, and blade assembly 350. In one embodiment, housing 14 comprises a clamshell configuration with top and bottom housings 16, 20 that surround motor 18 and drive mechanism 22, although other configurations for housing 14 could be practiced and still utilize the features described in this disclosure. In one embodiment electric motor 18 operates with power from batteries or electricity from an outlet, and includes rotating motor output shaft 32 that rotates about axis of rotation 36. Drive mechanism 22 comprises eccentric drive 40 that is offset from axis of rotation 36 of motor output shaft 32. Blade assembly 350 is coupled secured to housing 14 by housing fasteners.

FIGS. 8-11 illustrate blade assembly 350, which comprises lower blade 54, spring 58, guide 162, washer 66, upper blade 74, yoke 378, guide fasteners 82, and guide or retainer 250. Lower blade 54, which can also be referred to as a first blade, comprises main body 110 and a plurality of lower blade teeth 114. Lower blade teeth 114 extend along a nominal lower blade edge 118, which may be defined, for example, by a line 118 connecting the roots of teeth 114. Lower blade 54 also includes a pair of through-holes 122 that couple to guide 250, and a pair of threaded holes 126 for receiving guide fasteners 82 to mount blade assembly 350 to lower blade 54.

In one embodiment spring 58 comprises U-shaped spring base 132, a pair of securing arms 148 extend generally parallel to each other from the spring base 132, and a pair of arcuate-shaped fixed ends 140 opposite a pair of free ends 144 along each arm 136. Free ends 144 of spring 58 interface against channels 336 in yoke 378 to bias yoke 378 against upper blade 74.

Figure 11:
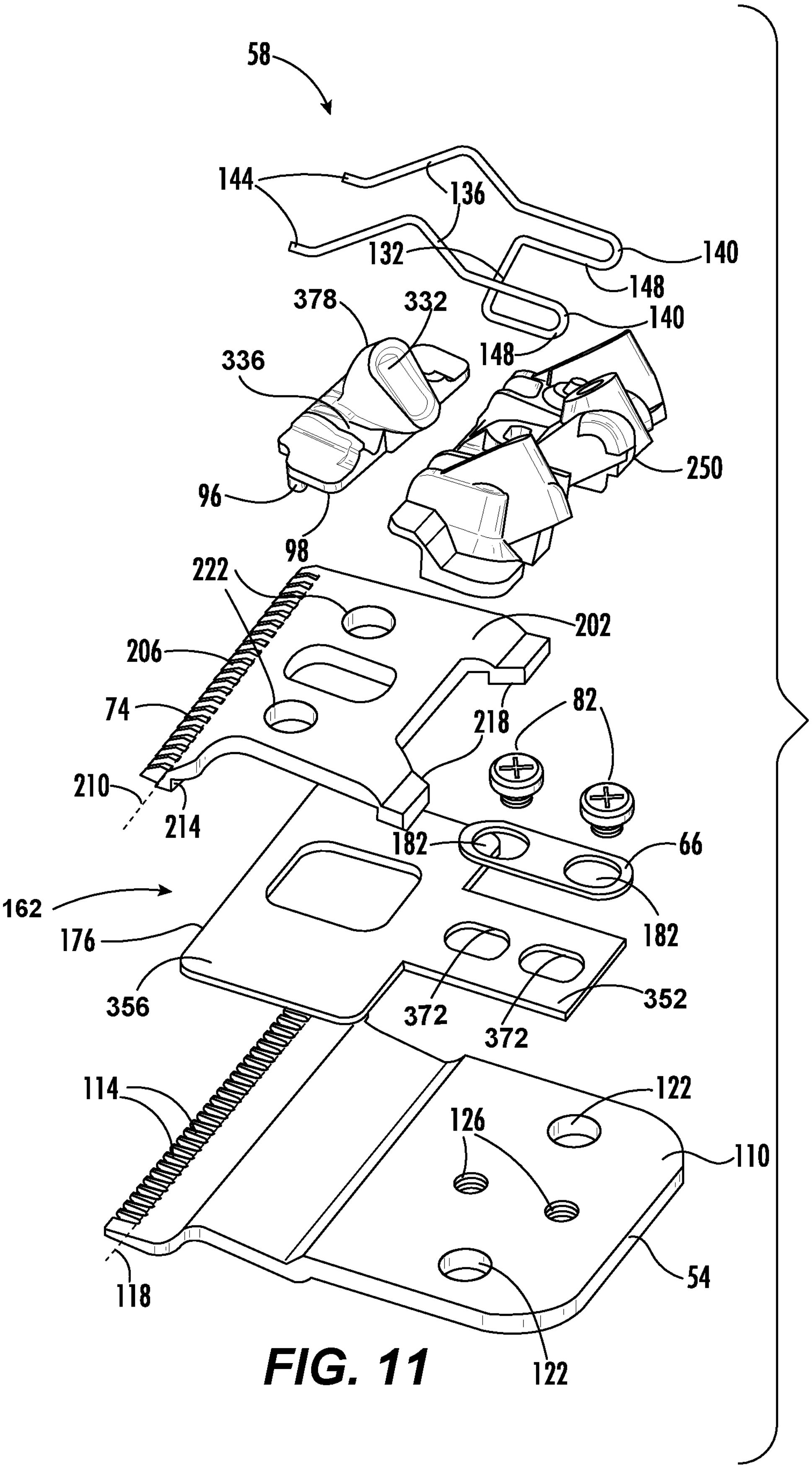
FIG. 11 is an exploded view of a blade assembly according to an embodiment.

Guide 162 is a T-shaped piece mounted to lower blade 54. Guide 162 comprises guide base 352 and cross portion 356. Guide base 352 comprises slots 372 extending parallel to the major axis of the guide base 352 and perpendicular to the major axis of the cross portion 356. Cross portion 356 comprises guide edge 176 parallel to lower blade edge 118 when guide 162 is disposed above lower blade 54 (as shown in FIG. 11). Guide 162 guides the reciprocating movement of upper blade 74 with guide edge 176 and guide 250 retains spring 58 against guide base 352.

Washer 66 interfaces against guide base 352. Washer 66 comprises slots 182 that align with slots 372 in guide base 372. Guide fasteners 82 extend through slots 182, 372 in washer 66 and guide base 352, respectively, and thread into threaded holes 126 in main body 110 of lower blade 54.

Upper blade 74, which may also be referred to as the second blade, sits on top of lower blade 54 and guide 162 (from the perspective of FIG. 11). Guide 162 is disposed between upper and lower blades 74, 54. Upper blade 74 comprises main body 202 and a plurality of upper blade teeth 206. Upper blade teeth 206 extend along nominal upper blade edge 210, which in one embodiment is defined by a line 210 connecting the roots of teeth 206. Upper blade 74 is positioned proximate lower blade 54 with upper blade edge 210 parallel to and offset from lower blade edge 118. Depending guide surface 214 is on a bottom of the upper blade 74 (from the perspective of FIG. 11) and is parallel to upper blade edge 210. Depending guide surface 214 engages guide edge 176. Guide edge 176 restricts movement of upper blade 74 perpendicular to lower blade edge 118.

The engagement of guide surface 214 against guide edge 176 guides movement of upper blade 74 parallel to blade edge 118 of lower blade 54. This engagement maintains a consistent blade gap 220 between parallel upper and lower blade edges 210, 118 as upper blade 74 reciprocates with respect to lower blade 54. Blade gap 220 refers to a forward-rearward offset of the blade edges 118, 210 and not a vertical separation. Upper blade teeth 206 are immediately adjacent or proximate lower blade teeth 114 to perform a shearing function. Guide 162 serves at least the purpose of maintaining a constant blade gap 220 while guide 250 fixes spring base 132.

Feet 218 protrude from upper blade main body 202. Feet 218 straddle guide base 352 and are disposed on body 110 of lower blade 54 when blade assembly 350 is fully assembled. Feet 218 create a vertical gap between upper and lower blades 74, 54. The distance between feet 218 provides sufficient room for upper blade 74 to reciprocate with respect to lower blade 54 and guide 162 without feet 218 hitting guide base 152. Upper blade body 202 comprises a pair of holes 222 for coupling upper blade 74 with yoke 378.

Yoke 378 is disposed above upper blade 74 (from the perspective of FIG. 11). Pegs 96 protrude from lower surface 98 of yoke 378 and are inserted into holes 222 in main body 202 of upper blade 74 to couple yoke 378 to upper blade 74. Yoke 378 comprises receiver 332 that couples with eccentric drive 40 of drive mechanism 22. Yoke 378 also comprises channels or grooves 336 on opposite sides of the receiver 332.

Channels 336 comprise opening 86 through which free ends 144 of spring arms 136 extend. Free ends 144 apply a downward (from the perspective of FIG. 11) biasing force on upper blade 74.

Yoke 378 converts motion of drive mechanism 22 into reciprocation of upper blade 74 with respect to lower blade 54. This reciprocation cuts hair between teeth 114, 206 of lower and upper blades 54, 74. In one or more alternate embodiments, free ends 144 are coupled to upper blade 74 rather than the yoke 378.

Figure 12:
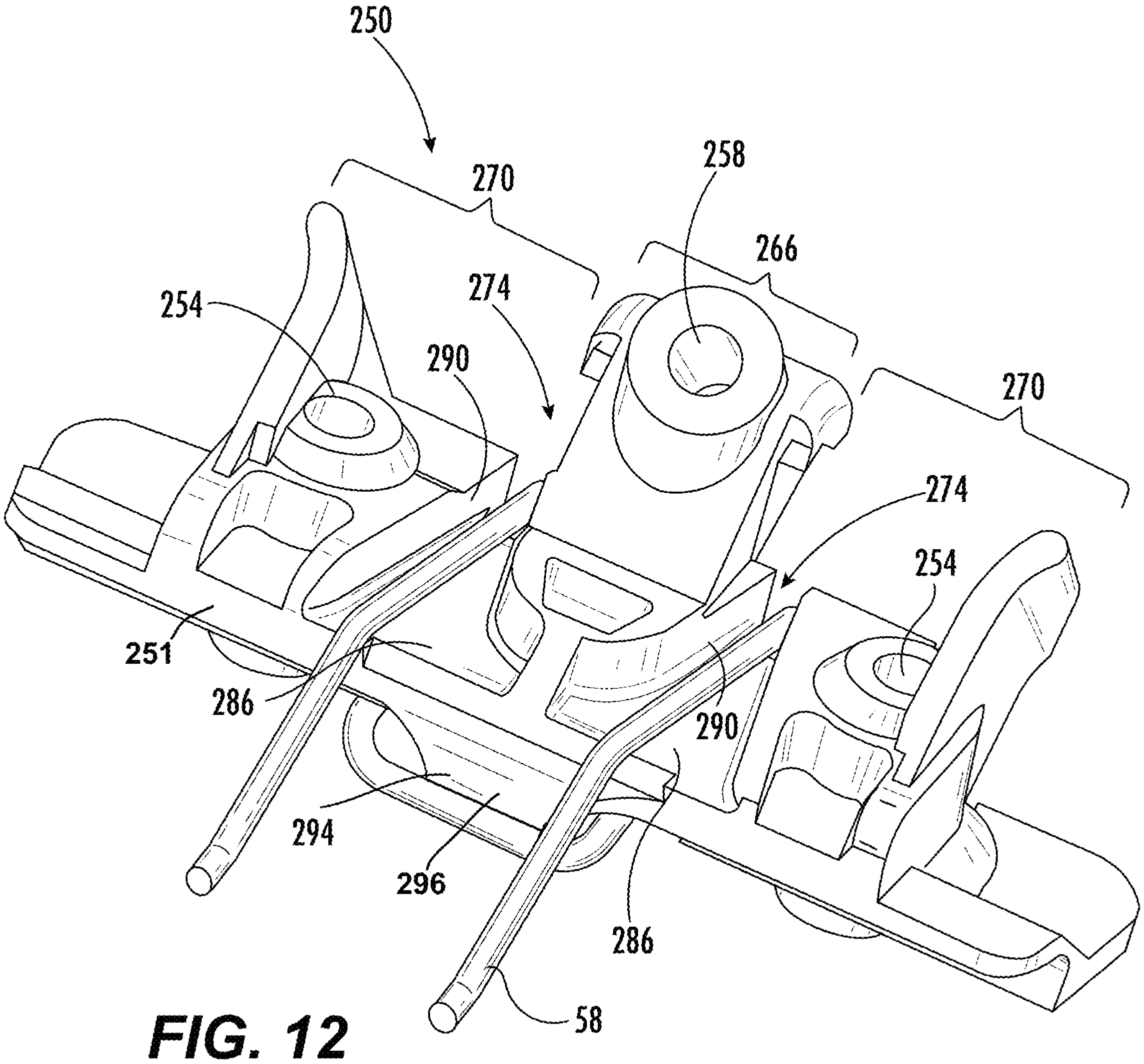
FIG. 12 is a perspective view of a spring retainer according to an embodiment.
Figure 13:
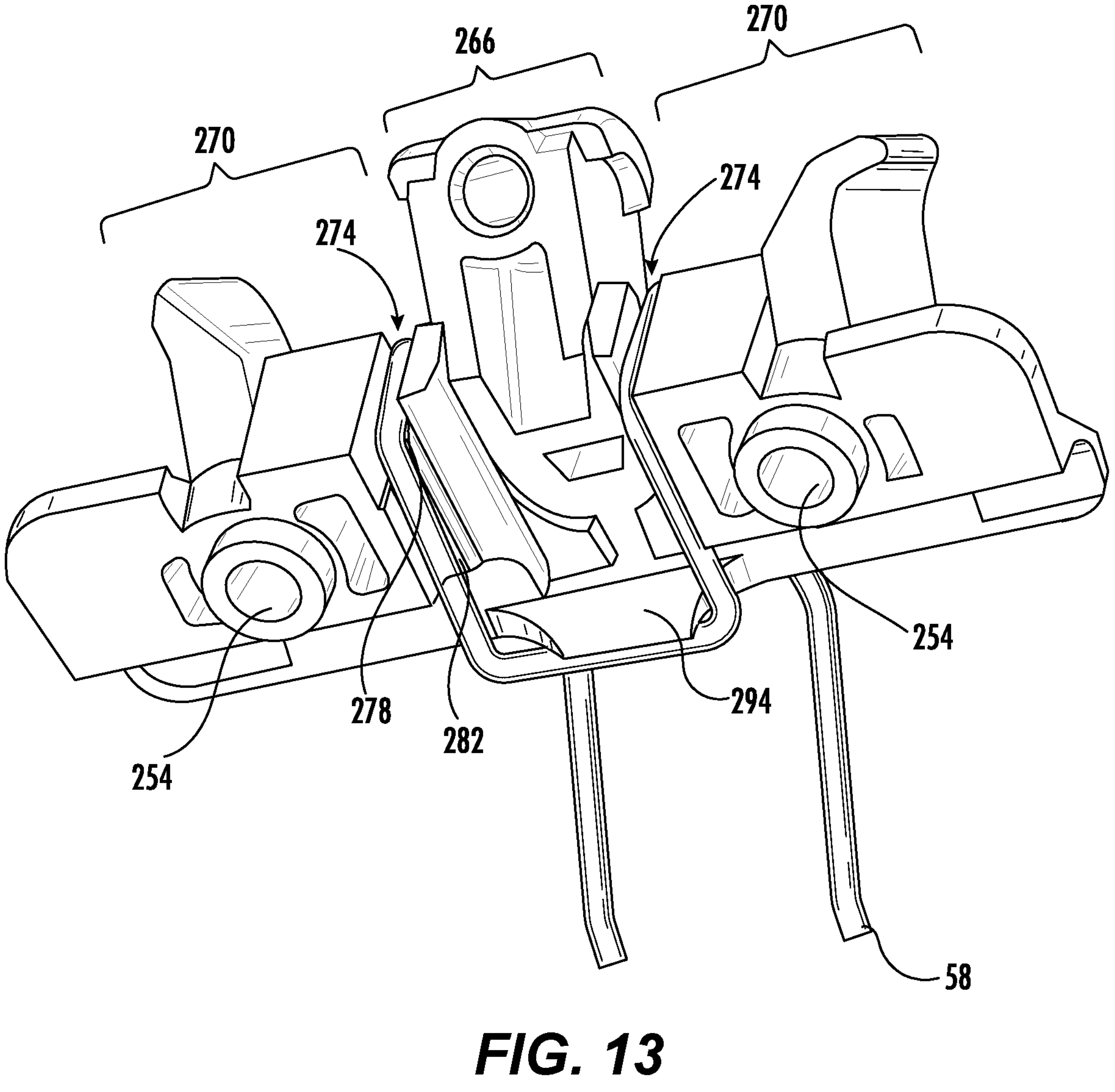
FIG. 13 is a perspective view of a spring retainer according to an embodiment.

Turning to FIGS. 12-13, fixed ends 140 are disposed within respective channels 274 of guide 250. Channels 274 comprise channel arcs 278, around which fixed ends 140 are disposed, upper channel 286, against which spring arms 136 are disposed, lower channel 282, against which securing arms 148 of spring 58 are disposed, and channel sidewalls 290, which secure spring 58 laterally within channel 274. Spring base 132 is biased against a curved upper surface 296 of tongue 294, both securing spring 58 against guide 250 and biasing free ends 144 of spring 58 against upper surface 90 of upper blade 74.

Guide 250 comprises center body member 266 between a pair of side members 270. Guide 250 is coupled to lower blade 54 via fasteners 344 extending through holes 254. Guide 250 is coupled to lower housing 20 with a screw (not shown) that passes through lower housing 20 and hole 258, the screw having threads that engage the inner surface of hole 258. Tongue 294 protrudes from a front surface 251 of guide 250 towards yoke 378 when blade assembly 350 is fully assembled.

In one embodiment, blade assembly 350 is assembled by stacking spring 58, guide 162, washer 66, upper blade 74, guide 250 and yoke 378 on lower blade 54, and extending guide fasteners 82 through slots 182, 372 of washer 66 and guide 162 and threading guide fasteners 82 into threaded holes 126 in lower blade 54. Spring 58 applies a downward biasing force (from the perspective of FIG. 11) on upper blade 74. This biasing force of spring 58 sandwiches guide 162 between upper blade 74 and lower blade 54. Spring 58 functions as a tension spring because free ends 144 exert the tension of arms 136 against upper blade 74.

The placement of guide fasteners 82 in slots 182, 372 defines a range of positions of guide 162 with respect to lower blade 54, and therefore a range of widths for blade gap 220. Guide 162 may be moved toward lower blade edge 118 until one of guide fasteners 82 is disposed against an end of slot 182 or 372 in which it is positioned, at which point guide 162 is prevented by guide fastener 82 from moving further. It is possible for one fastener 82 to define the limit of forward adjustability and the other fastener 82 to define the limit of rearward adjustability. The position of guide 162 with respect to lower blade 54 (and therefore blade gap 220) can be adjusted by loosening guide fasteners 82, moving guide 162 within the range of positions, and tightening guide fasteners 82 when guide 162 is in a desired position and a desired blade gap 220 is achieved.

The position of guide 162 corresponds to or defines the width of blade gap 220 because guide 162 is fixed with respect to lower blade 54, and upper blade 74 reciprocates along guide edge 176. When guide 162 is adjusted to the forward limit in the range of positions, blade gap 220 is minimized and when guide 162 is adjusted to the rear limit in the range of positions, blade gap 220 is maximized. Blade gap 220 determines the length to which the hair cutting apparatus 10 will cut hair; the smaller blade gap 220 is, the shorter the length to which the hair will be cut.

When assembled and adjusted to a desired blade gap 220, guide 250 is attached to lower housing 20 via a housing fastener. When guide 250 is aligned with the mounting hole on lower housing 20 so that the housing fastener can be threaded into lower housing 20, eccentric drive 40 protrudes within receiver 332. When motor 18 is engaged, eccentric drive 40 rotates around axis of rotation 36. Orbital movement of eccentric drive 40 is converted into reciprocating movement of yoke 378 and upper blade 74 with respect to lower blade 54, which is held stationary with respect to housing 14 by fasteners threaded through holes 126 that couple lower blade 54 to guide 250.

When yoke 378 and upper blade 74 reciprocate with respect to lower blade 54, spring base 132 is fixed with respect to lower blade 54. Fixed ends 140 of spring arms 136 remain substantially fixed with respect to lower blade 54 by virtue of being coupled to guide 250.

Spring arms 136 are of sufficient length to accommodate a range of reciprocating motion of upper blade 74 and yoke 378 with respect to lower blade 54. In various other embodiments, spring 58 requires compliance coils in the base or arms to accommodate some of the reciprocating motion. According to various embodiments consistent with the present disclosure, on the other hand, no compliance coils in spring base 132 or in spring arms 136 are required to accommodate reciprocation of upper blade 74 with respect to lower blade 54.

Thus, the disclosure provides, among other things, a blade assembly having an entrapped spring to hold the upper and lower blades in an operational condition and an adjustable guide member for adjusting the blade gap while the upper and lower blades are held in the operational condition. Various features and advantages of the disclosure are set forth in the following claims.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present disclosure.

While the current application recites particular combinations of features in the claims appended hereto, various embodiments of the disclosure relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A blade assembly comprising:
- a first blade having teeth extending along a first blade edge;
- a second blade having teeth extending along a second blade edge parallel to the first blade edge, and the second blade supported relative to the first blade;
- a yoke coupled to the second blade, the yoke converts motion of a drive into reciprocation of the second blade relative to the first blade to cut hair;
- a spring comprising:
  - a pair of free ends;
  - a pair of spring arms, each of the pair of spring arms extending from a respective one of the free ends, each of the pair of spring arms biasing the second blade toward the first blade;
  - a pair of fixed ends, each of the fixed ends extending from a respective one of the spring arms;

- a pair of securing arms, each of the securing arms extending from a respective one of the fixed ends; and
  - a spring base that extends between the pair of securing arms; and
- a retainer comprising:
  - a tongue, the tongue extending from a front surface of the retainer toward the yoke, the tongue interfaces against the spring to bias the spring against the second blade; and
  - channels, the channels comprising channel arcs around which the fixed ends are disposed.

2. The blade assembly of claim 1, the channels further comprising channel sidewalls that secure the spring laterally within the channels.

3. The blade assembly of claim 1, the channels further comprising:
- upper channels against which the spring arms are disposed; and
- lower channels against which the securing arms are disposed.

4. The blade assembly of claim 3, wherein, when the yoke is coupled to the second blade, the upper channels face upward in a direction away from the second blade, and the lower channels face downward toward the first blade.

5. The blade assembly of claim 1, further comprising a guide including a guide base and a cross portion, wherein the guide base and the cross portion from a T-shape.

6. The blade assembly of claim 5, wherein the second blade is moveable relative to the cross portion of the guide.

7. The blade assembly of claim 5, wherein the guide base is selectively fastened to the first blade.

8. A blade assembly comprising:
- a first blade having teeth extending along a first blade edge;
- a second blade having teeth extending along a second blade edge parallel to the first blade edge, the second blade supported relative to the first blade;
- a yoke coupled to the second blade, the yoke configured to convert motion of a drive into reciprocation of the second blade relative to the first blade to cut hair;
- a spring comprising:
  - a plurality of free ends;
  - a plurality of spring arms, a respective one of the spring arms for each of the plurality of free ends, each of the spring arms extending from a respective one of the free ends, at least one of the spring arms biasing the second blade towards the first blade;
  - a plurality of fixed ends, a respective one of the fixed ends extending from each of the spring arms;
  - a plurality of securing arms, a respective one of the securing arms extending from each of the fixed ends; and
  - a spring base that extends between the securing arms; and
- a retainer comprising:
  - a tongue that interfaces against the spring base, the tongue protruding from a front surface of the retainer towards the yoke such that the spring base is biased against the tongue, securing the spring against the retainer and biasing the plurality of free ends; and
  - a pair of channels, each one of the pair of channels comprising a channel arc around which a respective one of the plurality of fixed ends is disposed; and
  - channel sidewalls that secure the spring laterally within the channels.

9. The blade assembly of claim 8, wherein a distance between the first blade edge and the second blade edge defining a blade gap.

10. The blade assembly of claim 8, the retainer further comprising a center body member positioned between a pair of side members, wherein the tongue protrudes away from the center body member.

11. The blade assembly of claim 10, wherein the tongue includes a curved upper surface that interfaces against the spring base and wherein the curved upper surface extends from the center body member.

12. The blade assembly of claim 11, wherein the spring base is positioned between the tongue and the second blade.

13. The blade assembly of claim 10, wherein each one of the pair of channels is positioned between the center body member and a respective one of the pair of side members.

14. The blade assembly of claim 8, further comprising a guide, the guide comprising a guide base and a cross portion, wherein the guide base is selectively fastened to the first blade, and wherein the guide base and the cross portion form a T-shape.

15. The blade assembly of claim 14, the second blade comprising a pair of feet, the guide base extends between the pair of feet, wherein in response to the second blade reciprocating relative to the cross portion of the guide, the pair of feet slide along a portion of the first blade.

16. A blade assembly comprising:

a first blade having teeth extending along a first blade edge;

a second blade having teeth extending along a second blade edge parallel to the first blade edge;

a yoke coupled to the second blade;

a spring comprising:

at least two free ends;

at least two spring arms, each of the spring arms extending from a respective one of the free ends, the spring arms biasing the second blade towards the first blade;

at least two fixed ends, each of the fixed ends extending from a respective one of the spring arms;

at least two securing arms, each of the securing arms extending from a respective one of the fixed ends; and a spring base that extends between the securing arms; and a retainer comprising:

a tongue including a curved surface that protrudes from a front of the retainer towards the yoke and the second blade, the curved surface interfaces against the spring base; and channels that receive the spring and secure the spring against the retainer, each of the channels comprising:

a channel arc around which a respective one of the fixed ends is disposed;

an upper channel against which a respective one of the spring arms is disposed;

a lower channel against which a respective one of the securing arms is disposed; and channel sidewalls which secure the spring laterally within the channels.

17. The blade assembly of claim 16, the retainer further comprising a center body member positioned between a pair of side members, wherein the tongue protrudes away from the center body member, and wherein each of the channels is positioned between the center body member and a respective one of the pair of side members.

18. The blade assembly of claim 16, further comprising a guide member, the guide member comprising a guide base and a cross portion, wherein the guide base is selectively fastened to the first blade, and wherein the guide base and the cross portion form a T-shape.

* * * * *